April 9, 1968  J. P. ELWARD, JR., ET AL  3,377,558
APPARATUS AND METHOD FOR DETERMINING VARACTOR
QUALITY FACTOR BY MEASURING THE PHASE SHIFT
RESULTING FROM THE APPLICATION OF TWO
DIFFERENT VARACTOR BIAS LEVELS Filed Nov. 23, 1964

INVENTORS J. P. ELWARD, JR.
M. UENOHARA
BY

Roderick B. Anderson
ATTORNEY

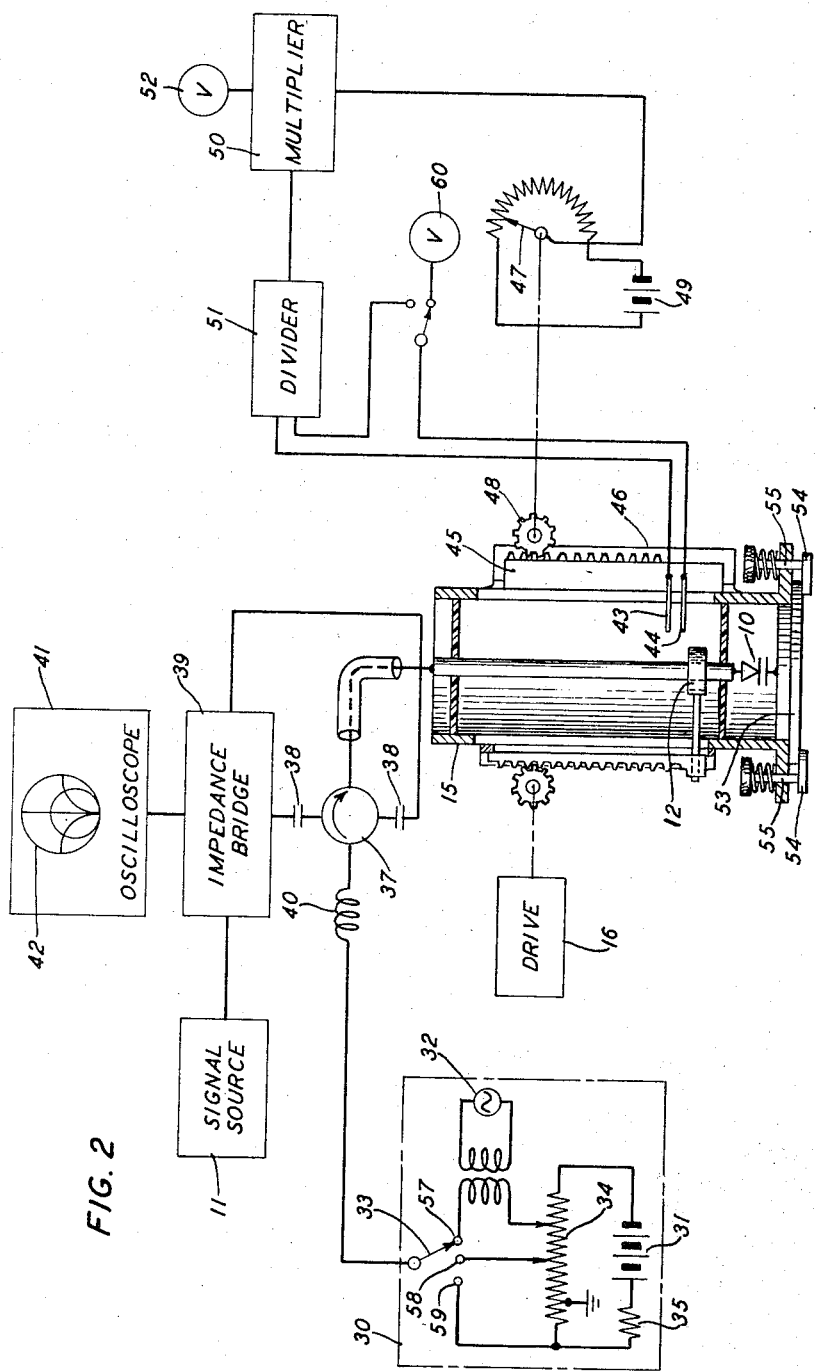

3,377,558
APPARATUS AND METHOD FOR DETERMINING VARACTOR QUALITY FACTOR BY MEASURING THE PHASE SHIFT RESULTING FROM THE APPLICATION OF TWO DIFFERENT VARACTOR BIAS LEVELS
John P. Elward, Jr., Newark, and Michiyuki Uenohara, Scotch Plains, N.J., assignors to Bell Telephone Laboratories, Incorporated, New York, N.Y., a corporation of New York
Filed Nov. 23, 1964, Ser. No. 413,237
12 Claims. (Cl. 324—158)

ABSTRACT OF THE DISCLOSURE

The quality factor $\tilde{Q}$ of a varactor in a transmission line is measured by multiplying a voltage which is a function of the voltage standing wave ratio in the transmission line with the varactor biased at its resonant bias voltage, and a voltage which is a function of the phase difference of a voltage standing wave with the diode biased at its maximum bias voltage and a voltage standing wave with the diode biased at its resonant bias voltage.

---

This invention relates to electrical measuring techniques, and more particularly, to methods and apparatus for measuring the dynamic quality factor of varactor diodes.

The variable reactance diode, or varactor, is a diode having a capacitance that varies as a function of the bias applied across it. As pointed out in the patent of M. Uenohara, No. 3,281,691, granted Oct. 25, 1966, assigned to Bell Telephone Laboratories, Incorporated, the assignee of this application, the inspection and evaluation of varactors after they have been manufactured, to determine that they have satisfactory electrical characteristics, can be a rather complicated procedure. The most satisfactory method of evaluating each diode is to determine its dynamic quality factor $\tilde{Q}$, which is defined by $$\tilde{Q} = \frac{S_1}{2\omega R_s} \quad (1)$$

where $\omega$ is the approximate signal frequency with which the diode is to be used, $R_s$ is the spreading resistance of the diode, and $S_1$ is the rate of change of the diode elastance as given by the first order coefficient of the Fourier expansion of the diode elastance.

Conventional techniques for determining the dynamic quality factor described above are very time consuming and require considerable technical skill. It is, of course, important to reduce the time and skill required in making appropriate evaluations if the varactors are to be mass produced economically. The Uenohara application teaches that a varactor to be tested can be mounted in a coaxial cable as part of a high frequency circuit in such a manner that $$\tilde{Q} = \frac{1}{2}\left(\frac{n^2 S_1}{\omega R_g}\right)\left(\frac{R_g}{n^2 R_s}\right) \quad (2)$$

It is possible to arrange the circuit such that the first factor of Equation 2 is equal to 1, or $$\frac{1}{2}\left(\frac{n^2 S_1}{\omega R_g}\right) = 1 \quad (3)$$

Uenohara then shows that the second factor of Equation 2 is equal to the voltage standing wave ratio (VSWR) of the coaxial line when the diode is biased at its resonant voltage, or $$\frac{R_g}{n^2 R_s} = VSWR \quad (4)$$

The resonant voltage is the bias voltage at which the reactance of the diode is zero. Within the stated restrictions, Equation 2 can therefore be expressed as $$\tilde{Q} = VSWR \quad (5)$$

The voltage standing wave ratio is merely the ratio of the voltage maximum in the coaxial cable to the voltage minimum along the cable when the diode is biased at its resonant voltage. This ratio is easily determined by a pair of coaxial cable voltage probes spaced a quarter wavelength apart in the coaxial cable.

In order to meet the requirement of Equation 3 in the Uenohara technique, it is necessary first to ascertain the diode capacitance at resonant bias $C_0$, the spreading resistance $R_s$ of the diode, and the factor $\gamma$, a function of the doping profile of the diode. Even when these values are known, it may be difficult to satisfy with accuracy the requirement of Equation 3. For reasons to be explained later, the factor $(n^2 S_1/\omega R_g)$ of Equation 3 will herein be referred to as the normalized reactance component.

It is an object of this invention to provide a method and apparatus for quickly and easily determining the dynamic quality factor of varactor diodes as a function of their normalized reactance components as well as a function of their voltage standing wave ratios.

This and other objects of the invention are attained by a testing apparatus comprising a coaxial cable slotted section in which a diode to be tested can be mounted at one end. A pair of coaxial cable probes spaced a quarter wavelength apart are mounted on the coaxial cable; when one of the probes is located at a voltage minimum the other probe is necessarily positioned at a voltage maximum so that the outputs of the two probes gives an indication of the voltage standing wave ratio in the cable.

Under certain conditions, which will be described more fully later, the normalized reactance component of the diode is directly proportional to the distance between corresponding voltage minima along the coaxial cable when the diode is biased at its maximum bias voltage and at its resonant bias voltage, respectively. The maximum bias voltage of a diode is its maximum rated voltage, or the maximum voltage at which the diode will be biased during its operative life. We take advantage of this phenomenon to generate an analog voltage that is proportional to the normalized reactance component, which enables us to determine $\tilde{Q}$ as a function of this component. The diode is first biased at its maximum bias voltage and one of the two coaxial cable probes is moved to a voltage minimum location. The diode is then biased at its resonant voltage and that same probe is then moved to the corresponding new voltage minimum location. A linkage attached at one end to the probe and at the other end to a potentiometer establishes an analog voltage which is a function of distance between the two voltage minima. This voltage is multiplied in a computer circuit with a VSWR analog voltage generated by the two probes to give a direct Q indication in accordance with Equation 2. This indication does not require that the normalized reactance component be a prescribed constant as set forth in Equation 3.

Certain preliminary adjustments of the testing apparatus must be made before testing of varactor diodes is made as pointed out above. However, after the apparatus has been properly set up, a relatively unskilled operator can quickly test varactors with greater accuracy than has heretofore been attainable. Further, diodes can be tested without previously determining certain relevant parameters of the diode because the requirement of Equation 3 need not be met. These and other features of our invention will be better understood from a consideration of the following detailed description taken in conjunction with the accompanying drawing in which:

FIG. 2 is a combination block and schematic diagram of apparatus for measuring the dynamic quality factor of a diode in accordance with the invention.

Figure 1:
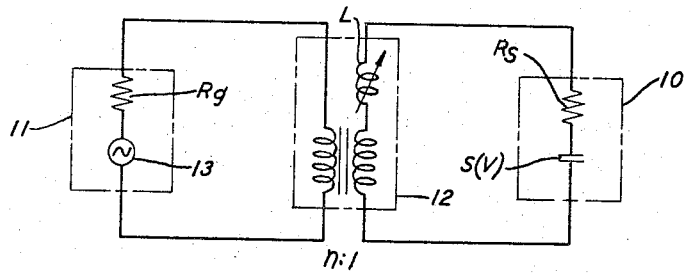
FIG. 1 is an equivalent circuit of a portion of the diode measuring apparatus in accordance with the invention.

Referring now to FIG. 1 there is shown an equivalent circuit of a varactor measuring apparatus of the general type described in the aforementioned Uenohara patent application. $S(v)$ and $R_s$ represent respectively the junction elastance and the spreading resistance of the diode 10 which is to be measured. Signal source 11 comprises a generator 13 and an equivalent output impedance $R_g$. The effective impedance of the diode is transformed to a higher value by a tuning device 12 which comprises a variable inductance L and a transformer for giving the desired impedance transformation $n$ associated with the circuit.

In practice, as shown in FIG. 2, the diode 10 is mounted in a coaxial cable slotted section 15 between the inner and outer conductors. The tuning device 12 which gives the desired impedance transformation and inductance shown in FIG. 1 is a small metallic tuning ring surrounding the inner conductor which can be moved within the cable by a suitable drive mechanism 16.

As was pointed out above, the dynamic quality factor $\tilde{Q}$ of a varactor is given by $$\tilde{Q} = \frac{1}{2}\left(\frac{n^2 S_1}{\omega R_g}\right)(VSWR) \quad (6)$$

where VSWR is the voltage standing wave ratio of the coaxial line when the diode is biased at its resonant voltage. As will be shown below, the factor $n^2 S_1/\omega R_g$ is equal to the transformed reactance of the diode as normalized by the generator impedance $R_g$ and will hereafter be referred to as the normalized reactance component of the diode. The Uenohara device measures the dynamic quality factor of the diode solely as a function of the voltage standing wave ratio after the circuit has been manipulated to give a prescribed constant normalized reactance component. The manner by which the circuit of FIG. 1 measures the dynamic quality factor of the diode as a function of its normalized reactance component as well as the VSWR can be appreciated from a consideration of some of the relevant parameters of the diode and other elements of FIG. 1.

Assume first that the diode 10 is biased at its resonant voltage $V_0$, in which case $$S(V_0) = S_0 \quad (7)$$

where $S_0$ is the elastance at the resonant bias. Assume next that the tuning device 12 is adjusted such that the reactance of the series inductor satisfies the resonance condition $$\omega L = \frac{S_0}{\omega} \quad (8)$$

The impedance $Z_R$ seen by generator 13 will then be $$Z_R = n^2 R_s \quad (9)$$

It is important that the diode operates properly between a maximum positive bias voltage $V_1$ and a maximum negative bias voltage $V_2$. At the maximum positive voltage $V_1$ the elastance of the diode is $$S(V_1) = S_0 - S_1 \quad (10)$$

In this case the impedance $Z_1$ seen by the generator is $$Z_1 = n^2 R_s + jn^2\frac{S_1}{\omega} \quad (11)$$

Assume next that the maximum capacitive reactance $X_{C(max.)}$ of the circuit is equal to the maximum inductive reactance $X_{L(max.)}$ or, $$X_{C(max.)} = X_{L(max.)} = X \quad (12)$$

The maximum capacitive reactance occurs at voltage $V_2$, while the maximum inductive reactance occurs at voltage $V_1$. The effective resistance R and the maximum reactance X of the diode are then defined as $$Z_1 = R + jX \quad (13)$$

At the maximum negative bias voltage $V_2$, the diode elastance is given by $$S(V_2) = S_0 + S_1 \quad (14)$$

The impedance $Z_2$ seen by the generator is $$Z_2 = n^2 R_s - jn^2\frac{S_1}{\omega} \quad (15)$$

and $$Z_2 = R - jX \quad (16)$$

From Equations 11 and 15

$$Z_1 - Z_2 = \frac{2n^2 S_1}{\omega} = 2X \quad (17)$$

and, $$Z_1 + Z_2 = 2n^2 R_s = 2R \quad (18)$$

As was pointed out in Equation 1 the dynamic quality factor of a varactor is defined as $$\tilde{Q} = \frac{S_1}{2\omega R_s} \quad (19)$$

From Equations 16 and 17 the dynamic quality factor can be expressed as $$\tilde{Q} = \frac{|Z_1 - Z_2|}{2|Z_1 + Z_2|} = \frac{X}{2R} \quad (20)$$

The dynamic quality factor can then be expressed as $$\tilde{Q} = \frac{1}{2}\left(\frac{X}{Z_0}\right)\left(\frac{Z_0}{R}\right) \quad (21)$$

where $Z_0$ is the characteristic impedance of the coaxial cable slotted section 15 FIG. 2, and of its equivalent circuit of FIG. 1 which includes diode 10 and inductance L. Since X was defined as the impedance seen when the diode is biased at its positive maximum voltage $V_1$ or its maximum negative voltage $V_2$, the quantity $(X/Z_0)$ is equal to the normalized reactance of the diode at voltages $V_1$ or $V_2$; i.e., it is the transformed reactance of the diode at either of its maximum bias voltages as normalized by the generator impedance. The factor $(Z_0/R)$ is numerically equal to the voltage standing wave ratio in the coaxial cable at the resonant bias voltage $V_0$. Equation 6 can therefore be rewritten as $$Q = \frac{1}{2} \text{(normalized reactance component at } V_1 \text{ or } V_2)(VSWR \text{ at } V_0) \quad (21)$$

Figure 3:
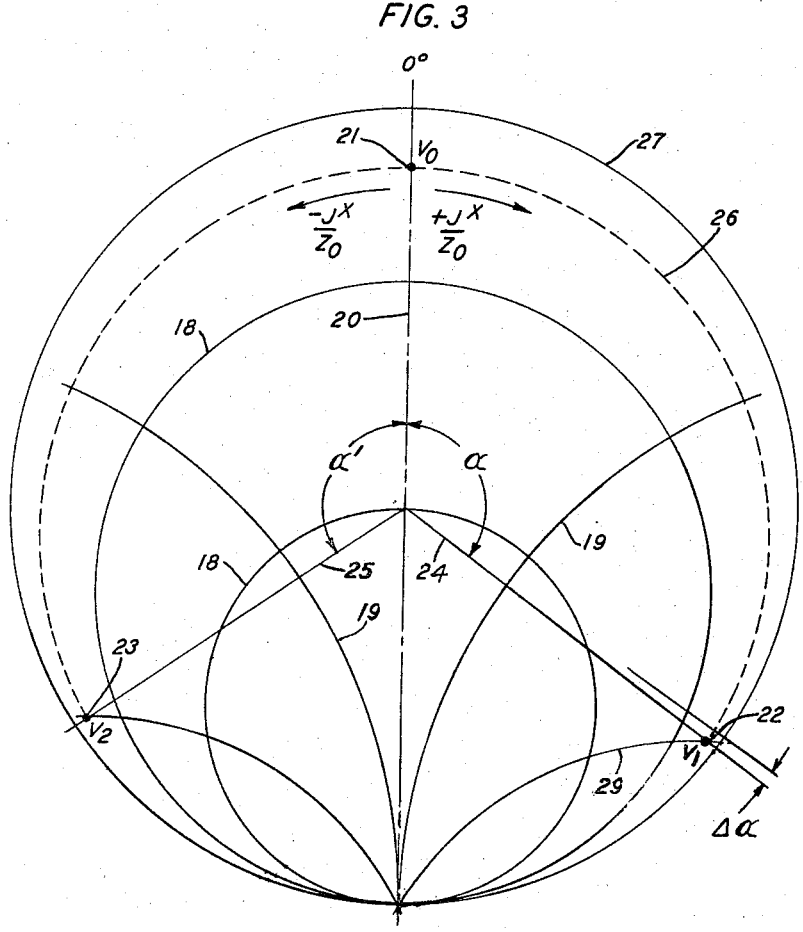
FIG. 3 is an impedance graph of the type generally known as a Smith chart, which is given for purposes of explanation.

Our technique for computing the normalized reactance component can be better appreciated from a consideration of FIG. 3 which is an impedance graph of the type generally known as a Smith chart wherein the curves 18 represent loci of constant resistance and the curves 19 represent loci of constant reactance. The area to the right of the center line 20 represents the positive or inductive reactance domain, while the area to the left represents the capacitive reactance domain, as indicated by the arrows. When the diode is biased at its resonant bias $V_0$, the impedance of the line is represented by a point 21 on center line 20 which is the zero reactance line of the graph. Point 22 represents a typical impedance location of the line when the diode is biased at its maximum positive voltage $V_1$ which results in a maximum inductive reactance component. Point 23 represents a similar typical impedance location when the diode is biased at its maximum negative voltage $V_2$ which gives a maximum capacitive reactance. When the maximum inductive reactance equals the maximum capacitive reactance the angle $\alpha$ between the center line 20 and line 24 which is drawn between point 22 and the center of the chart, is equal to the angle $\alpha'$ between the center line and a line 25 drawn between point 23 and the center of the chart. The constant resistance locus 26 represents the impedance of the line as the diode bias is changed from the maximum negative to the maximum positive values.

Curve 27 is the zero resistance locus and would represent the locus 26 if the series resistance were zero. If the points 22 and 23 which lie on locus 26 are fairly close to the edge of the chart, or to curve 27, the tangent of $\alpha$ is approximately equal to the normalized reactance component or $$\tan \alpha = \left(\frac{X}{Z_0}\right) = \text{(normalized reactance component at } V_1\text{)} \quad (22)$$

Equation 22 is absolutely correct if the angle $\alpha$ is measured from the centerline 20 to the junction of curve 27 with the reactance curve 29 upon which point 22 is located. In other words, the angle increment $\Delta\alpha$ represents the error of Equation 22. It can therefore be appreciated that if point 22 is located near the edge of the chart the error will be so small as to be negligible. It can be shown that the higher the VSWR, the closer curve 26 will be located to the edge of the chart. If the VSWR at the resonant bias is adjusted to fall between 5 and 10, the error will be small enough to be negligible for most practical varactors. Moreover, if the maximum voltages $V_1$ and $V_2$ are sufficiently large to produce fairly large normalized reactance components, and hence large angles $\alpha$, the error is further reduced. This is because locus 26 approaches outer curve 27 as the angle $\alpha$ increases.

The circuit of FIG. 2 uses the relationship of Equation 22 to measure the normalized reactance component of diode 10. The circuit includes a diode bias supply 30 comprising a direct-current voltage source 31 and an alternating-current sweeping voltage source 32. A switch 33 is operable to couple the diode 10 to the alternating source 32 or to the direct-current voltage source 31 through potentiometer 34 and resistor 35. The bias supply 30 is connected to the coaxial cable slotted section 15 through a circulator 37. Blocking capacitors 38 restrict the low-frequency and direct bias currents.

The signal source 11 is connected to the coaxial cable slotted section 15 through an impedance bridge 39 and the circulator 37. High signal frequency energy is prevented from flowing into the bias supply circuit by a high frequency choke 40. Also connected to the coaxial cable through the impedance bridge and the circulator is an oscilloscope 41. The purpose of the impedance bridge 39 is to establish voltages which will drive oscilloscope 41 to present a display of the impedance in coaxial cable slotted section 15 which is identical to the display which would be presented if that impedance were plotted on a Smith chart. Accordingly, the display surface 42 of the oscilloscope is graduated to form a Smith chart. The construction of impedance bridge 39 to give a Smith chart display on an oscilloscope in this manner is described in the paper "Linear, Complex-Reflection Coefficient Bridge" by M. W. P. Strandberg, Microwave Journal, June 1961, page 66.

Attached to one side of the coaxial cable slotted section are a pair of movable coaxial cable voltage probes 43 and 44 which are shown schematically. These probes are spaced a quarter-wavelength apart and are used for determining the voltage standing wave ratio in the slotted section as is described in the Uenohara application. The probes are supported by a first table 45 which is movably mounted on a movable second table 46. A potentiometer is ganged to the first table 45 by a gear mechanism 48 such that the resistance of the potentiometer varies in proportion to any movement of upper table 45 with respect to lower table 46. Current through the potentiometer 47 is supplied by a voltage source 49 and is directed into a multiplier circuit 50. Coaxial cable voltage probes 43 and 44 are likewise connected to multiplier 50 through a divider circuit 51. Multiplier 50 operates to multiply the current from potentiometer 47 with the ratio of the currents from coaxial cable voltage probes 43 and 44. This analog current product is then delivered to a voltmeter 52 which is scaled in terms of Q to give a direct reading of the dynamic quality factor of diode 10.

The diode 10 which is to be tested by the apparatus of FIG. 1 is inserted into the slotted section by removing an end cover 53 of the cable. After the diode has been inserted the cover 53 is maintained in position by a pair of cam-shaped supports 54 which are mounted on spring biased posts 55. When the diode is to be removed, the posts 55 are depressed in opposition to the spring bias and the cam-shaped supports are rotated away from the cover 53 so that the cover can be removed.

Before the diode can be tested the tuning device 12 is adjusted such that the maximum capacitive impedance of the circuit equals the maximum inductive impedance in accordance with Equation 12. This is done by positioning switch 33 in contact with terminal 57 which is connected to a potentiometer terminal through the transformer of the swept voltage source 32. Voltage 32 varies the bias voltage delivered by bias supply 30 between the maximum positive bias voltage $V_1$ and the maximum negative bias voltage $V_2$. For example, if the maximum bias voltages of diode 10 were $+0.5$ and $-5.0$ volts respectively, bias supply 30 would deliver bias voltages which are swept between these two extremes. With the impedance bridge 39 constructed in accordance with the teachings of the Strandberg paper as pointed out above, the oscilloscope 41 will display as a trace the constant resistance locus 26 shown in FIG. 3. The tuning device 12 is moved by drive mechanism 16 until the trace representing curve 26 is symmetrically disposed on the display surface 42 of the oscilloscope; i.e., $\alpha$ is made to equal $\alpha'$. This indicates that the relationship of Equation 12 has been fulfilled.

The switch 33 is then located to make contact with terminal 58 in which case the diode bias voltage is supplied solely by direct-current source 31. The potentiometer 34 is adjusted until the display surface of the oscilloscope shows a spot located at point 21, shown on FIG. 3. This indicates that the bias voltage is equal to $V_0$, the resonant bias voltage of the diode. Next, the switch 33 is located to make contact with terminal 59 which supplies the maximum positive bias voltage $V_1$. The second table 46 supporting the coaxial cable voltage probes 43 and 44 is then moved in the direction of the diode 10 until the probe 44 nearest the diode is positioned at the voltage minimum nearest the diode. This is determined by temporarily connecting the voltage probe 44 to a volt meter 60. No reading of the voltage standing wave ratio detected by the two probes is taken at this point; the purpose of this step is merely to locate the probe 44 at the voltage minimum nearest the diode when the diode is biased at $V_1$ so that the change in location of the voltage minimum with change of diode bias can thereafter be determined. It is also to be noted that no change of potentiometer 47 has been made by the orientation of the second table 46. After the voltage minimum nearest the diode has been located in this manner the second table 46 is locked in position against further movement.

Next, the switch 33 is located to make contact with terminal 58 which has already been adjusted to bias the diode at its resonant bias voltage $V_0$. Under this condition the voltage probe 44 will no longer be located at a voltage minimum. The first table 45 is then moved to locate coaxial cable voltage probe 44 at the new voltage minimum nearest diode 10. As the first table 45 is moved it drives potentiometer 47 thereby generating a voltage that is proportional to the distance through which the first table 45 has been moved. After the new voltage minimum has been located the coaxial cable probe 44 is disconnected from voltmeter 60 and connected to the divider circuit 51. Divider circuit 51 establishes a voltage representing the voltage standing wave ratio of the coaxial cable when the diode is biased at $V_0$. The multiplier circuit then multiplies the voltage standing wave ratio with the voltage delivered from potentiometer 47.

The distance $l$ through which the first carriage 45 moves between voltage minima as the diode bias is changed from $V_1$ to $V_0$ is representative of the resulting phase shift of the standing wave in the coaxial line. The ratio of $l$ to the wavelength $\lambda$ in the coaxial line is therefore proportional to the angle $\alpha$ of FIG. 3 or, $$\tan\left(\frac{l}{\lambda}\cdot 360°\right)=\tan\alpha \text{ (in degrees)} \quad (23)$$

The potentiometer 47 is geared by mechanism 48 so that it adjusts the generated voltage from source 49 as a tangent function of the distance $l$. Potentiometer 47 is of a readily available type which has a resistance vs. angle relationship of $$R \propto \tan\theta \quad (24)$$

where $\theta$ is the angular position of the sweeping arm of the potentiometer. With the potentiometer geared to the first table 45 such that the resistance varies as $\tan\alpha$, the voltage output $V_{out}$ of the potentiometer 47 after the first table has moved distance $l$ is an analog of the normalized reactance component, or, from Equation 22.

$$V_{out} \propto \begin{bmatrix} \text{normalized reactance} \\ \text{component at } V_1 \end{bmatrix} \quad (25)$$

and from Equation 21

$$\tilde{Q} \propto V_{out}\cdot VSWR \quad (26)$$

The voltage output of multiplier 50 is therefore directly proportional to the dynamic quality factor of the diode 10. This voltage is read directly by voltmeter 52 which may be appropriately scaled to give a direct $\tilde{Q}$ indication.

The structure of the gear mechanism 48 has not been shown because any of numerous types of obvious mechanical designs can be used. The rack and pinion arrangement shown schematically in FIG. 2 has been presented merely to give a simple and clear representation of the function of the mechanism and does not necessarily represent a preferred form. The linkage by which the gear mechanism drives potentiometer 47 may also take numerous forms. Moreover, the measurement of the tangent function of $\alpha$ could be made manually if so desired, in which case the gear mechanism for making the measurement automatically could be eliminated.

The multiplier 50 and divider 51 may be constructed in any of a number of ways which would be obvious to one skilled in the art. For example, log converters may be used in the divider to establish the logarithm analogs of the input voltages from the cable probes. The difference of the two voltages from the probes 43 and 44 would then be indicative of the voltage standing wave ratio. Likewise, the voltage from potentiometer 47 could be converted by a log converter and then added with the logarithm of the voltage standing wave ratio voltage to give the product voltage. Scaling of voltmeter 52 to give a direct Q indication in response to the analog product voltage is a straightforward procedure.

It should also be pointed out that movement of the first table 45 between two corresponding voltage minima is recommended for generating the voltage $V_{out}$ only because the minima are convenient to locate accurately with the cable probe 44. The distance $l$ could alternatively be taken between voltage maxima or between any corresponding points of the two standing waves. Also, the measurement could alternatively be made by first biasing the diode at its negative maximum bias voltage $V_2$, rather than $V_1$. In this case the angle $\alpha'$ of FIG. 3 would be measured, rather than $\alpha$.

In summary, the procedure for measuring the dynamic quality factor of a varactor in accordance with the invention is as follows:

(1) Mount the diode 10 in the coaxial cable slotted section as shown in FIG. 2.

(2) Set the switch 33 to terminal 57. The bias voltage is then swept from the positive maximum to the negative maximum, e.g., from $+0.5$ to $-5.0$ volts.

(3) Adjust the impedance bridge 39 and the tuning device 12 to obtain a symmetrical impedance swing along an approximately constant resistance locus by observing the oscilloscope display.

(4) Set the switch 33 to terminal 58 and adjust the potentiometer 34 so that the spot on the oscilloscope screen is located on the center line 20 of FIG. 3. This sets the bias voltage of this terminal at the resonant point.

(5) Set the switch 33 to terminal 59.

(6) Move the second table 46 until the coaxial cable probe 44 is located at the voltage minimum nearest to diode 10.

(7) Lock the second table 46 in this position and adjust potentiometer 47 so that a voltage representative of a zero distance is generated thereby.

(8) Set the switch 33 to terminal 58, that is, to the resonant bias voltage.

(9) Move the first table 45 until the coaxial cable probe 44 is located at the new minimum voltage point.

(10) Record the dynamic quality factor as indicated by the volt meter 52.

From the foregoing it is clear that numerous modifications of our test apparatus can be made to take advantage of our discovery that a measurement of distance between voltage minima along coaxial cable slotted section 15 can be used for generating an indication of the normalized reactance component of a varactor. Such modifications can be made without departing from the spirit and scope of the invention.

What is claimed is:

1. Apparatus for measuring the dynamic quality of a diode comprising:
   a transmission line for transmitting waves of a predetermined frequency;
   means for mounting a diode in said transmission line;
   said diode being resonant when it is biased at a first voltage intermediate its maximum positive and negative bias voltages;
   means comprising a pair of voltage probes spaced a quarter wavelength apart for measuring the voltage standing wave ratio along the transmission line;
   means for biasing the diode successively at one of said maximum voltages and the said first voltage;
   means connected to one of said probes for generating a second voltage that is proportional to the distance along the transmission line between corresponding voltage minima when the diode is at the maximum voltage and when it is at the first voltage;
   means for deriving a third voltage from said probes when the diode is biased at the first voltage;
   and means responsive to the second and third voltages for indicating the dynamic quality factors of the diode.

2. Apparatus for measuring the normalized reactance component of a varactor diode comprising:
   a transmission line;
   the varactor diode mounted in the transmission line;
   means for generating in said transmission line electromagnetic waves of a predetermined frequency;
   means mounted in said transmission line for adjusting the impedance of the diode seen by the wave generator such that the inductive reactance of the diode at one of its maximum bias voltages is substantially equal to its capacitive reactance at its other maximum bias voltage;

means for biasing the diode at one of its maximum bias voltages;

means for changing the diode bias to the diode resonant bias voltage;

and means for measuring the electrical phase shift of wave energy in said transmission line with said change of diode biasing.

3. The apparatus of claim 2 wherein the measuring means comprises a movable transmission line voltage probe connected to a voltage indicator for indicating the location of a first standing wave voltage in the transmission line when the diode is biased at its maximum bias voltage;

said movable probe further comprising means for indicating the location of a second standing wave voltage in the transmission line when the diode is biased at its resonant bias voltage;

said first and second standing wave voltages being at the same phase with respect to the corresponding standing waves;

and a variable voltage source connected to said probe for generating a voltage representative of the distance between the locations of the first and second standing wave voltages.

4. The method for measuring the dynamic quality factor of a varactor diode having an inherent impedance and maximum positive and negative bias voltages comprising the steps of:

mounting the diode in a wave transmission line;

generating electromagnetic wave energy at a predetermined frequency in the transmission line;

adjusting the impedance of the diode as seen at the location at which wave energy is generated such that the inductive reactance of the diode at its maximum positive bias voltage substantially equals its capacitive reactance at its maximum negative bias voltage;

providing first and second movable voltage probes in the transmission line that are permanently spaced a quarter wave length apart at the predetermined frequency;

biasing the diode at one of its maximum bias voltages, thereby establishing a first standing wave in the transmission line;

locating the first voltage probe at a first voltage minimum of the first standing wave;

biasing the diode at its resonant bias voltage, thereby establishing a second standing wave in the transmission line;

locating the first voltage probe at a second voltage minimum of the second standing wave that corresponds to the phase position of the first voltage minimum of the first standing wave;

generating a third voltage which is a function of the distance between the first and second voltage minima;

generating by means of the two voltage probes a fourth voltage which is a function of the voltage standing wave ratio of the second standing wave;

generating a fifth voltage which is a function of the product of the third and fourth voltages;

and providing an indication of magnitude of the fifth voltage.

5. Apparatus for measuring the dynamic quality factor of a varactor diode having maximum positive and negative bias voltages comprising:

a transmission line;

the varactor diode being mounted in the transmission line;

means for generating electromagnetic wave energy at a predetermined frequency in the transmission line;

mans for adjusting the impedance of the diode as seen by the wave generator such that the inductive reactance of the diode at its maximum positive bias voltage substantially equals its capacitive reactance at its maximum negative bias voltage;

first and second movable voltage probes in the transmission line that are permanently spaced a quarter wavelength apart at the predetermined frequency;

means for biasing the diode at one of its maximum bias voltages, thereby establishing a first standing wave in the transmission line;

means for locating the first voltage probe at a first voltage minimum of the first standing wave;

means for biasing the diode at its resonant bias voltage, thereby establishing a second standing wave in the transmission line;

means for moving the voltage probes a distance equal to the phase difference of the first and second standing waves and for locating the first voltage probe at a second voltage minimum of the second standing wave;

means connected to the first voltage probe for generating a third voltage representative of the distance between the first and second voltage minima;

said two voltage probes comprising means for generating a fourth voltage representative of the voltage standing wave ratio of the second standing wave;

means for generating a fifth voltage which is a function of the product of the third and fourth voltages;

and means for indicating the magnitude of the fifth voltage.

6. Apparatus for measuring the dynamic quality factor of a diode comprising:

a transmission line;

means for mounting a diode in the transmission line;

means for generating wave energy in the transmission line;

means for measuring the reactance of said diode;

means comprising a swept voltage source for periodically changing the bias on a diode between its maximum positive and maximum negative bias voltages;

means for adjusting the reffected impedance of the diode such that its reactances at its maximum positive and maximum negative bias voltages are of substantially equal magnitude;

means comprising a steady state voltage source for biasing the diodes successively at one of its maximum bias voltages and at its reasonant bias voltage;

first and second voltage probes mounted in the transmission line;

means for successively locating a first voltage probe at corresponding phase positions of the wave energy at the maximum diode bias voltage and at the resonant bias voltage;

a variable voltage source comprising a potentiometer;

means comprising the variable voltage source and a linkage interconnecting the first voltage probe to the potentiometer for generating a first voltage which is a function of the distance between the successive locations of the voltage probes;

means comprising the pair of voltage probes for generating a second voltage representative of the voltage standing wave ratio in the transmission line at the diode resonant bias voltage;

and means for indicating the product of the first and second voltages.

7. The apparatus of claim 6 wherein:

the means for measuring the reactance of the diode comprises an oscilloscope connected through an impedance bridge to the transmission line;

the display surface of the oscilloscope is graduated in the form of a Smith chart;

and the means for adjusting the reflected impedance of the diode comprises means for adjusting the constant resistance locus on the display surface to be symmetrical with respect to the central zero reactance axis of the Smith chart.

8. The apparatus of claim 6 wherein:

the potentiometer varies the first voltage as a tangent function of the distance between successive locations of the voltage probe.

9. The apparatus of claim 6 wherein:
the mounting means comprises a cover plate on one end of the transmission line;
means for supporting the cover plate comprising a support member eccentrically mounted on a rotatable shaft;
spring bias means for forcing the support member against the cover plate when the shaft is in a first angular position;
said support member being displaced from the cover plate when the shaft is in a second angular position, thereby permitting the cover plate to be removed.

10. The method for measuring the normalized reactance component of a varactor diode having maximum positive and negative bias voltages and a resonant bias voltage intermediate the maximum positive and negative bias voltages, said method comprising the steps of:
mounting the diode in a wave transmission line at one end thereof;
generating electromagnetic wave enrgy at a predetermined frequency in the transmission line;
biasing the diode at one of its maximum bias voltages, thereby establishing a first standing wave in the transmission line;
biasing the diode at its resonant bias voltage thereby establishing a second standing wave in the transmission line;
and measuring the phase shift of the second standing wave with respect to the first standing wave.

11. The method of claim 10 wherein:
the measuring step comprises the steps of:
generating a voltage which is a tangent function of said phase shift and indicating said voltage on a voltmeter.

12. The method of testing a varactor diode having maximum positive and negative bias voltages and a resonant bias voltage intermediate the said maximum positive and negative bias voltages comprising the steps of:
mounting the diode in a transmission line;
generating electromagnetic wave energy at a predetermined frequency in the transmission line;
biasing the diode at one of its maximum bias voltages, thereby establishing a first standing wave in the transmission line;
locating the voltage minimum of the first standing wave that is nearest the diode:
biasing the diode at its resonant bias voltage, thereby establishing a second standing wave in the transmission line;
locating the voltage minimum of the second standing wave that is nearest the diode;
generating a first voltage that is a function of the distance between said two voltage minima;
generating a second voltage representative of the voltage standing wave ratio in the transmission line when the diode is biased at its resonant bias voltage;
and multiplying the first and second voltages whereby the product provides an indication of the dynamic quality factor of the varactor diode.

References Cited
UNITED STATES PATENTS 3,335,368   8/1967   Loughery _____ 324—58 XR RUDOLPH V. ROLINEC, *Primary Examiner.*

E. L. STOLARUN, *Assistant Examiner.*